INVENTOR
LIONEL R. F. HARRIS
BY Hall & Houghton
ATTORNEY

INVENTOR
LIONEL R.F. HARRIS
BY
ATTORNEY

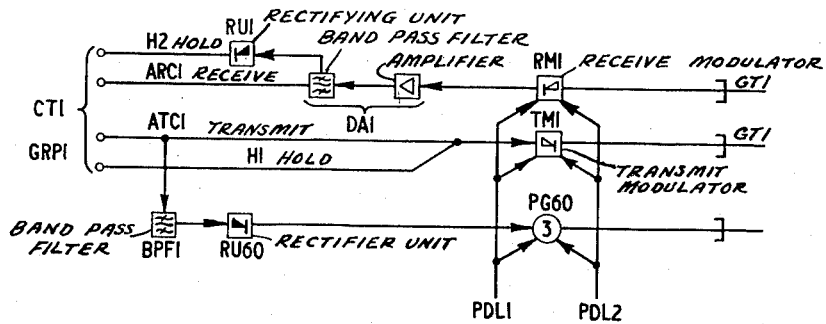
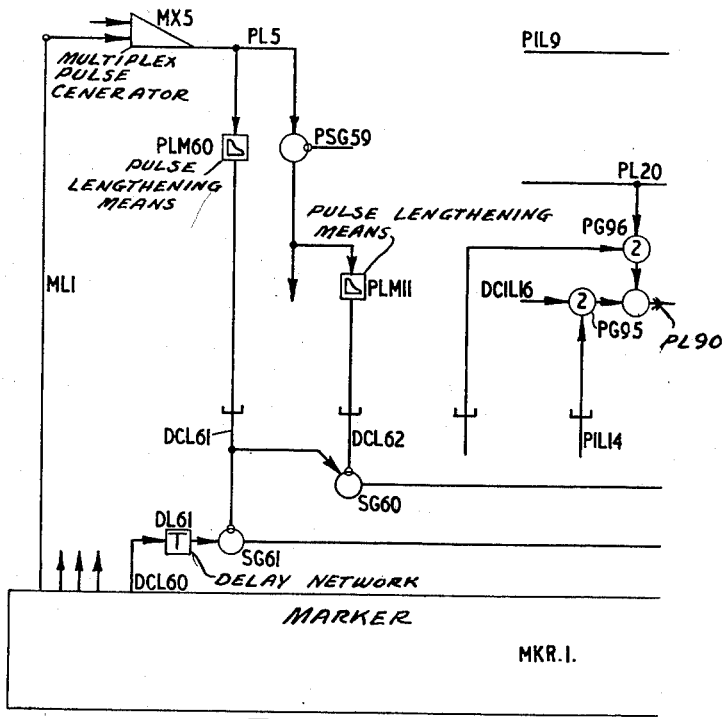
FIG. 5
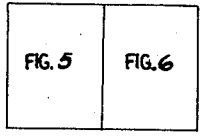
FIG. 4
INVENTOR
Lionel R. F. Harris
BY Hall & Houghton
ATTORNEY

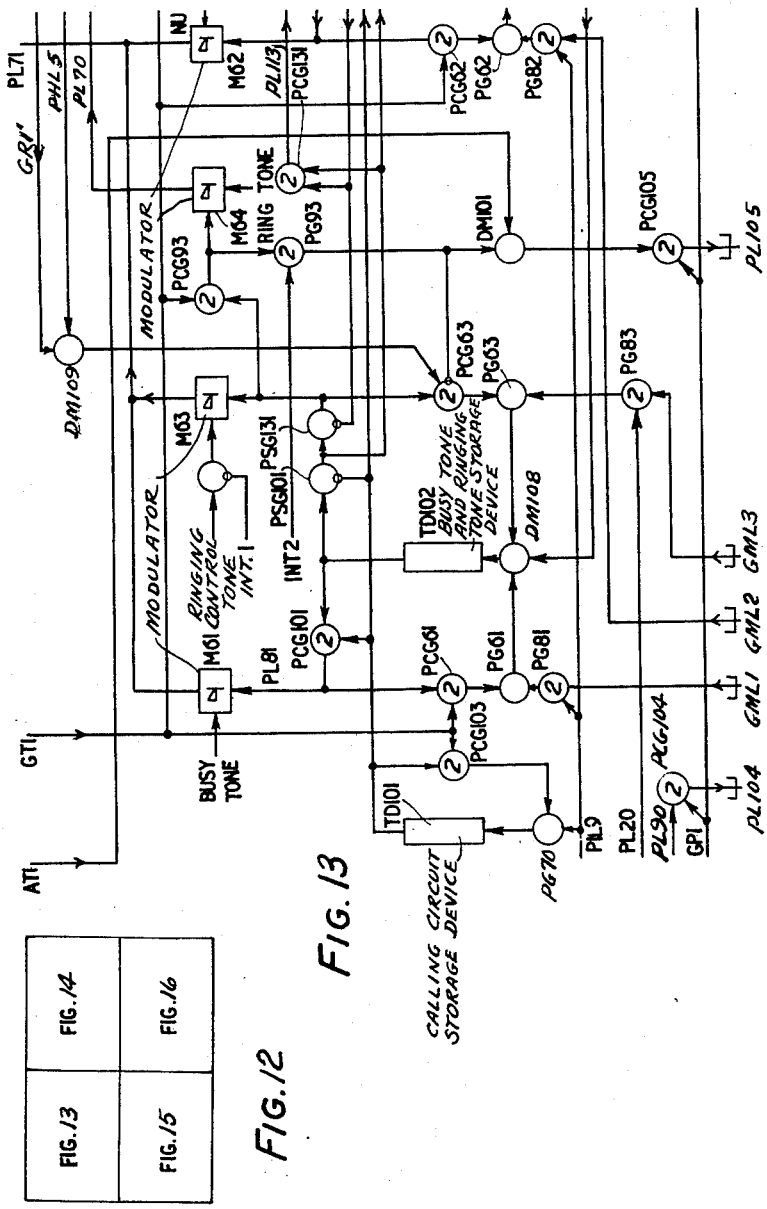

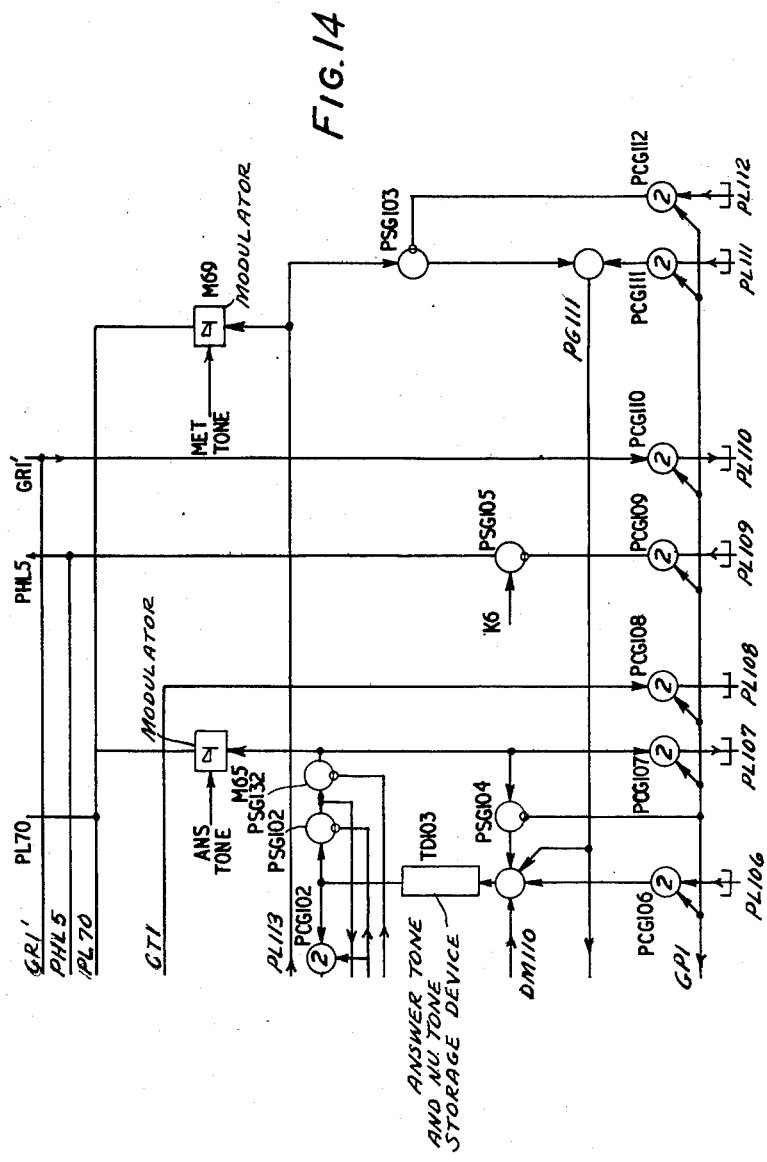

May 16, 1961  L. R. F. HARRIS  2,984,705
CONTROL APPARATUS FOR COMMUNICATION SYSTEMS
Filed June 14, 1954  13 Sheets-Sheet 13

FIG.16

INVENTOR
Lionel R.F. Harris
BY Hall, Houghton
ATTORNEY

United States Patent Office 2,984,705
Patented May 16, 1961

2,984,705

CONTROL APPARATUS FOR COMMUNICATION SYSTEMS

Lionel Roy Frank Harris, Kenton, England, assignor to Her Majesty's Postmaster General, London, England Filed June 14, 1954, Ser. No. 436,632

Claims priority, application Great Britain June 15, 1953

11 Claims. (Cl. 179—15)

This invention relates to control apparatus for communication systems particularly automatic telephone exchanges. The invention is particularly applicable to control apparatus such as supervisory equipment for automatic telephone exchange systems using time division multiplex for the purpose of selecting circuits, switching the connections between circuits and transmitting information such as speech signals.

Known telephone exchange systems include supervisory equipment which is defined in the specification as equipment providing facilities in the form of supervisory signals such as "number unobtainable" (N.U.) tone, "number engaged" or "busy" tone, "ringing" tone, etc. as well as metering signals over a trunk between switches in the exchange. The supervisory equipment may be capable of providing only a limited range of facilities in which case the exchange selecting means must cause a trunk incorporating the appropriate supervisory equipment to be selected when a connection is set up. Alternatively, the supervisory equipment may be capable of providing a complete range of facilities in which case the equipment must be able to change the facilities depending upon the class of connection it is serving and/or the signals which it receives. The present invention is particularly concerned with the latter kind of supervisory equipment.

The facilities required may conveniently be indicated to the supervisory equipment by a register or marker in systems incorporating these latter components. In such systems the connection between a calling circuit which may be, for example, a subscriber's line, junction circuit or manual board circuit and a called circuit which may similarly be any type of circuit is set up under the control of the register. The register and/or its associated equipment is in possession of all information regarding the type of call and information required by the supervisory equipment in respect of a connection may be signalled directly to the equipment or marking devices may be used. The register and/or marker may ascertain whether the designation information received from a calling circuit corresponds with a working code or whether it corresponds with a spare code, and also whether a called circuit is already engaged in a connection. In both cases the appropriate indications must be sent to the supervisory equipment so that, in the first case "number unobtainable" tone is caused to be sent by the supervisory unit to the calling circuit and in the second case "number engaged" tone is sent.

Other typical requirements of the supervisory equipment used on a connection between a calling party and a free called party are that the called party's bell or other means of indication should be operated, that the operating current causing this should be cut off when the called party answers and that the charge for the call should be registered against the calling party. When such a connection involves two or more exchanges it is necessary to repeat the answer signal when the called party answers, from the terminating exchange to the calling exchange and to arrange that the reception of the answer signal brings about the registration of the charge for the call against the calling party. Further common requirements are that on normal subscriber to subscriber calls the calling party should control the holding and release of the connection, that there should be a delay between the detection of the calling party's clearing signal and the release of the established connection and that in the event of the called party being a manual board the release of the connection should not occur until both the calling party and the manual board operator have cleared from the connection. Many other facilities will be required for other types of call but the foregoing are representative and it will be understood that in this specification the term supervisory equipment is intended to include equipment capable of providing the facilities which may be required on a connection.

According to the present invention there is provided control apparatus for a communication system having a plurality of trunks in which each trunk over which communication is to be established is allotted at least one characteristic time in a recurring time cycle and information relating to a trunk is received by and operated on by the apparatus at that time.

The characteristic time may be indicated by a pulse train forming one of a series of pulse trains and the apparatus then includes devices for storing and regenerating as desired any pulse train of the series.

Where the communication system employs time division multiplex for the purposes explained above, the pulse trains indicating the characteristic time may be coincident with or otherwise suitably timed to allow for transmission delays with respect to the pulse train used for effecting communication. The trunks in that case are constituted by the time division multiplex channels. Where communication between circuits is established by a register and/or marker there may be provided pulse trains coincident with or suitably timed with respect to pulse trains used for establishing communication over the trunks between a calling circuit and the register, a called circuit and the register and between the calling and called circuits.

In an automatic telephone exchange system having a large number of trunks, the trunks may conveniently be divided into groups and each group may have its own supervisory equipment. Furthermore, when time division multiplex is used for the purposes set forth above the first mentioned means are storage devices in which pulse trains corresponding to those of the connections on the time division multiplex common channels used for transmitting speech and hold signals through the exchange, may be stored and regenerated. Each storage device may relate to a particular facility to be associated with any connection or combination of connections made on the pair of common channels with which the equipment is associated and the presence of a pulse train in a storage device indicates that the facility related to that storage device is to be given to the connection characterised by said pulse train. Each storage device includes means whereby any pulse train stored in the device may be removed without affecting any other stored pulse trains. The storage devices may comprise for example ultrasonic mercury delay lines, electric or magnetostrictive delay lines or any other suitable storage device such as a group of cold cathode tubes one for each pulse train which each open a gate to which said pulse train is applied when operated. Other suitable devices will be known to those skilled in the art but for the purpose of description the invention will be described only with reference to the use of mercury delay line circulating systems.

Further, according to a subsidiary feature of the invention, when a connection between two trunks is being set up, the pulse train used for the connection is caused to operate those storage devices provided for the facilities required to be effective on the connection, so that the said pulse train appears at the output of said storage devices. Those facilities which are required to be effective on the connection are indicated by the register and/or marker when the connection is being set up. The marker for example may indicate by D.C. applied to leads individual to the following those facilities which it is required to make effective on the connection which it is setting up:

(a) That the called circuit must have ringing current sent out to it. This is required if the called circuit is a subscriber's line, for example. This information may be derived from the called number signals stored in the register which is connected at that time to the marker and therefore controlling the setting up of the connection.

(b) That busy tone should be transmitted to the calling circuit. This is required if the called circuit is or group of called circuits are all engaged, for example. This information may be derived by the marker, since in order to set up a connection between a calling circuit and a free called circuit it must ascertain whether the marked called circuits are free.

(c) That number unobtainable (NU) tone should be transmitted to the calling circuit. This is required, for example, if the called number signals do not correspond to a working circuit or group of circuits. This information may be derived from the marker and/or translator, since in order to set up a connection between a calling circuit and a free called circuit, it must be ascertained whether there is a working circuit corresponding to the called number signals stored in the register.

(d) That the connection should be released by the release of the calling party. This occurs when the called circuit is an ordinary subscriber. This information may be derived from the called number signals stored in the register which is connected at that time to the marker and therefore controlling the setting up of the connection. On four leads may similarly be indicated the charge to be registered against the calling party for the connection when the called party answers. This information may be derived from the called number signals. The above facilities will be taken as typical of those which may be provided.

Two embodiments of the invention suitable for the communication system described in the specification of now Pat. No. 2,910,542 issued October 27, 1959 will now be disclosed in more detail with reference to the accompanying drawings of which:

Fig. 4 shows the relationship of Figs. 5 and 6 when assembled to show one embodiment in block schematic form together with parts of a TDM communication system.

Fig. 7 shows the relationship of Figs. 8, 9, 10 and 11 when assembled to show the embodiment of Figs. 5 and 6, in greater detail.

Fig. 12 shows the relationship of Figs. 13, 14, 15 and 16 when assembled to show a block schematic circuit diagram of a second embodiment

*General description of system*

Figure 1:
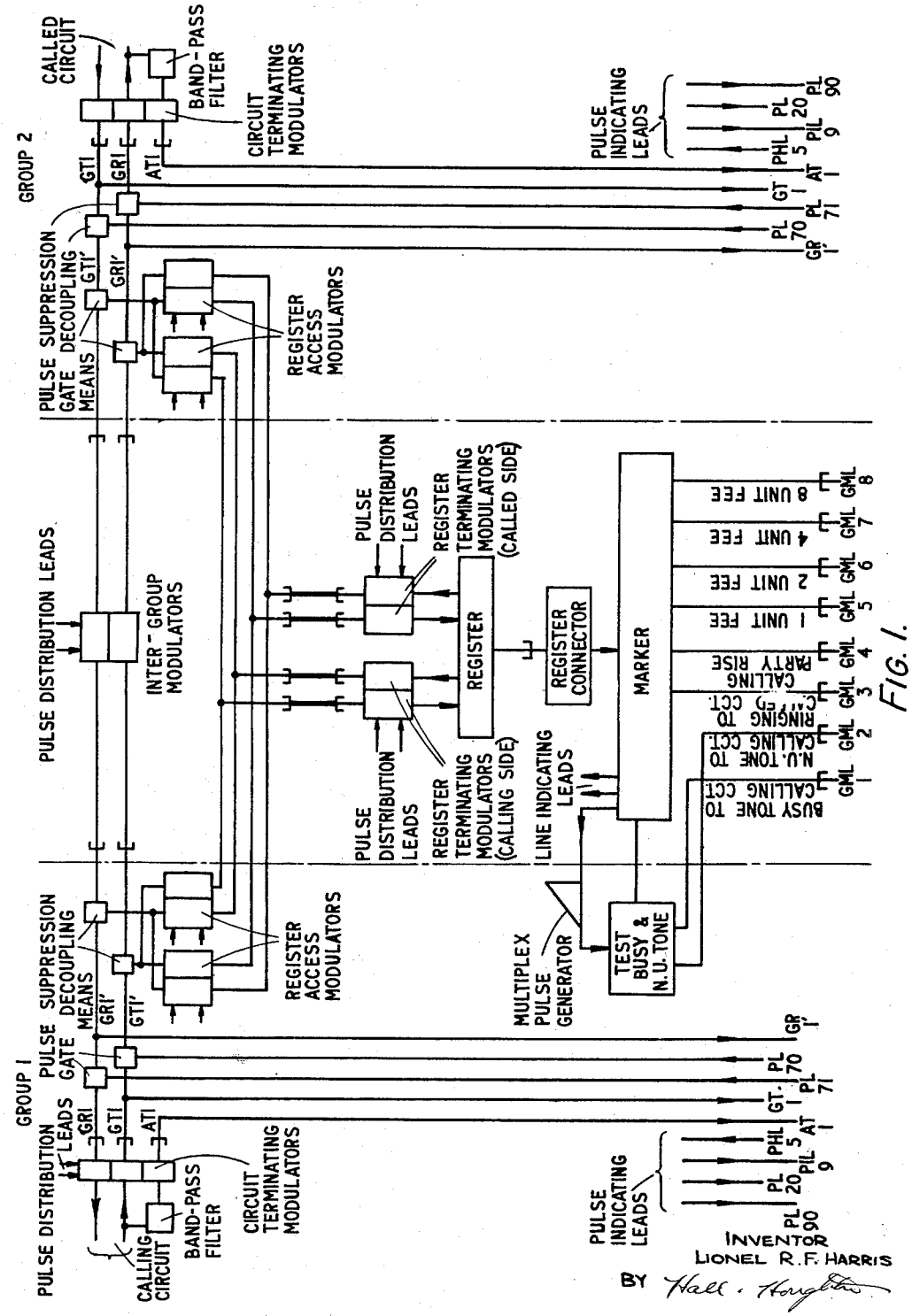
Fig. 1 shows in block schematic form part of a time division multiplex communication system incorporating supervisory apparatus according to the invention.
Figure 2:
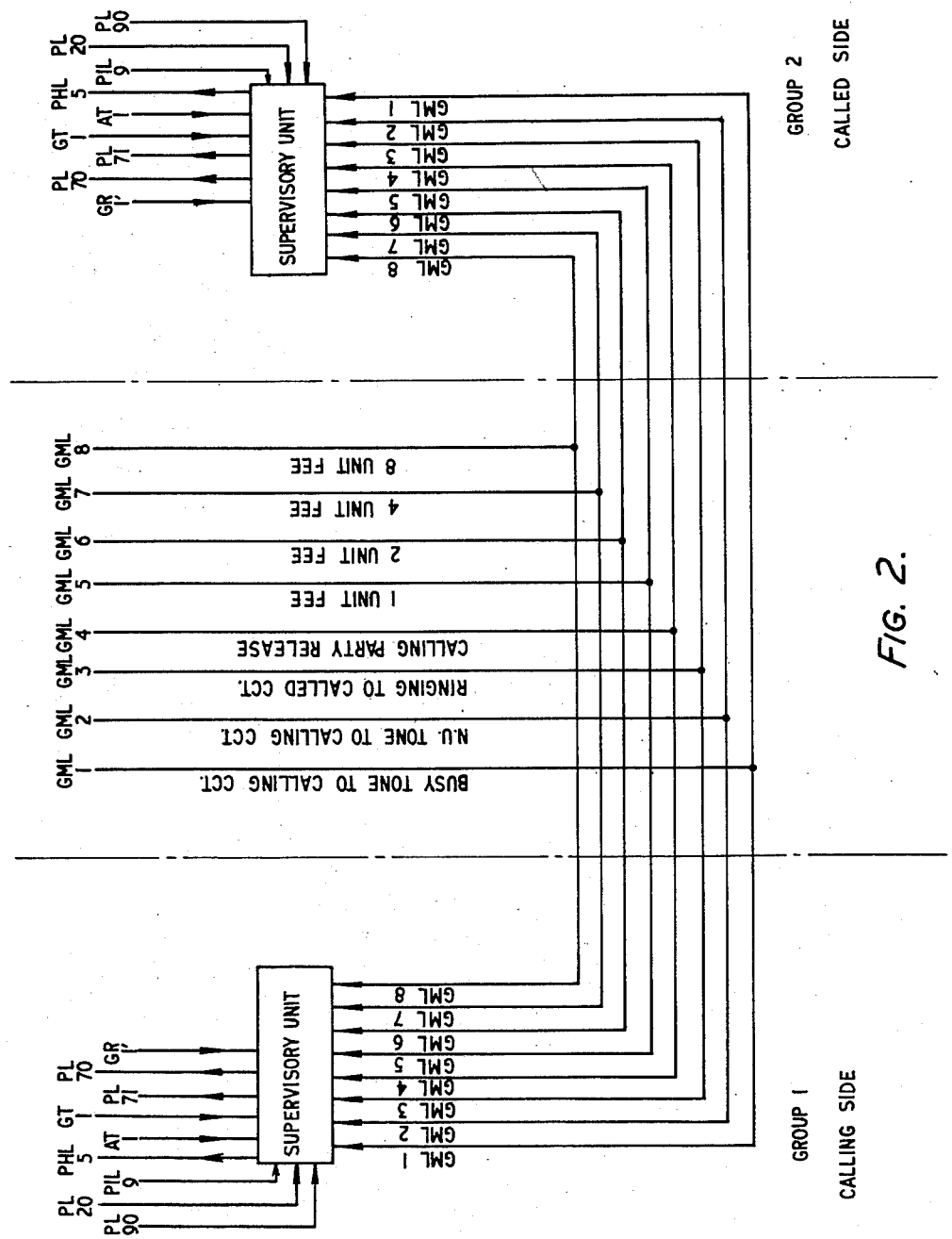
Figs. 2 and 3 show in block schematic style alternative forms of another part of the communication system, one or the other of these figures being arranged vertically beneath Fig. 1.

Referring now to the drawings and particularly to Fig. 1 with Fig. 2 arranged vertically beneath, there is illustrated the essentials of a telephone system for the purposes of the present invention. The drawings just listed are split into three sections by vertical lines to indicate more clearly the function of the supervisory apparatus which embodies the present invention. The left-hand section comprises a calling circuit, its group, group 1, and apparatus associated therewith while the right-hand section comprises a called circuit, its group, group 2, and apparatus associated therewith. The centre section comprises common apparatus.

The calling and called circuits are connected via circuit terminating modulators to group transmit and receive common leads GT1, GR1; GT1', GR1' respectively and thence via pulse suppression gate and decoupling means described in detail below to inter-group modulators one of which is shown in Fig. 1, center section and which serve when pulsed over pulse distribution leads connected to the modulators to permit communication between calling and called circuits.

The group transmit and receive common leads GT1, GR1, are also connected via register access modulators, register calling common leads and register terminating modulators (calling side) to a register common to both groups since it is also connected by register terminating modulators (called side), register called common leads and register access modulators to the transmit and receive common leads GT1' and GR1'. Only one register is shown in Fig. 1, center section, but it will be understood that there will normally be several, any one of which can be connected by a register connector to a marker Fig. 1, center section. The marker is connected by a plurality of leads to supervisory equipment associated with group 1 and to supervisory equipment associated with group 2.

Figure 3:
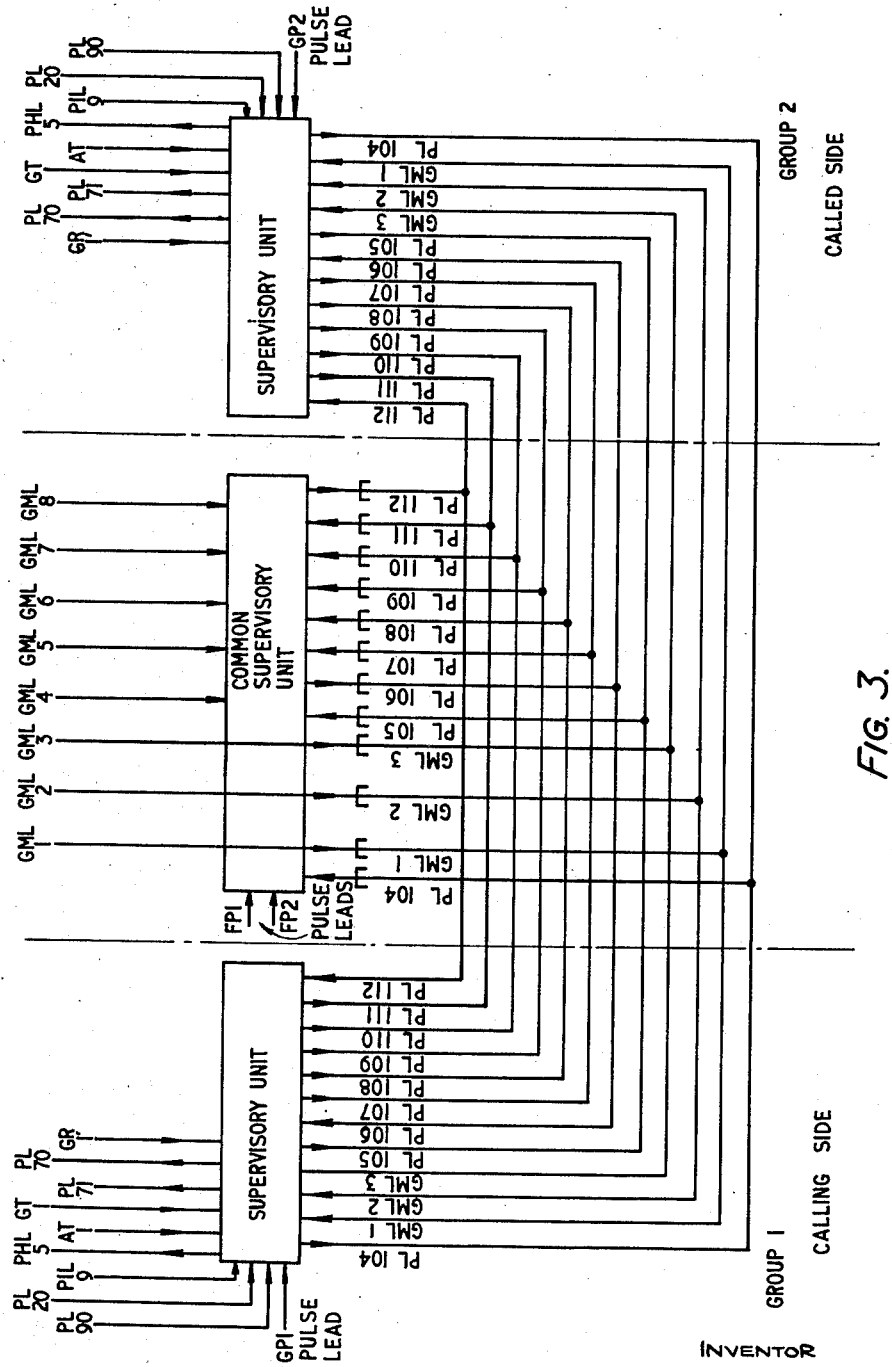

Fig. 3 shows an alternative arrangement in which the marker is pointed via a common supervisory unit to the supervisory equipment of the two groups.

The marker also has a series of indicating leads which are used in a manner to be described later to indicate circuits to be placed in communication. The indicating leads are connected to multiplex pulse generators provided one for each group which operate in conjunction with apparatus indicated in Fig. 1 as "test busy and N.U. tone" to transmit information to the supervisory equipment.

*General method of operation*

In considering the general operation of the system, it will be assumed that, as shown in Fig 1, the calling circuit is in group 1 and the called circuit is in group 2. The calling circuit first becomes connected via the pulse suppression gates and decoupling means, the register access modulators and the register terminating modulators (calling side) to a free register to which information concerning a called circuit is then transmitted. When sufficient information is stored in the register, the latter seeks connection to the marker, such connection being effected by the register connector.

Information relating to the connection to be set up from the calling circuit is then transmitted to the marker which proceeds to set up the connection. During the setting up of the connection, a communication between the calling circuit and a desired called circuit is prevented by the application of pulse trains to the pulse suppression gates of groups 1 and 2. Information held in the marker is sent to the supervisory equipment of the two groups and the connection is set up or the calling circuit is informed that a connection cannot be made.

The apparatus shown in Fig. 3 operates in a similar fashion, the common supervisory unit controlling in a manner described in more detail below the supervisory equipment of the two groups.

Figure 6:
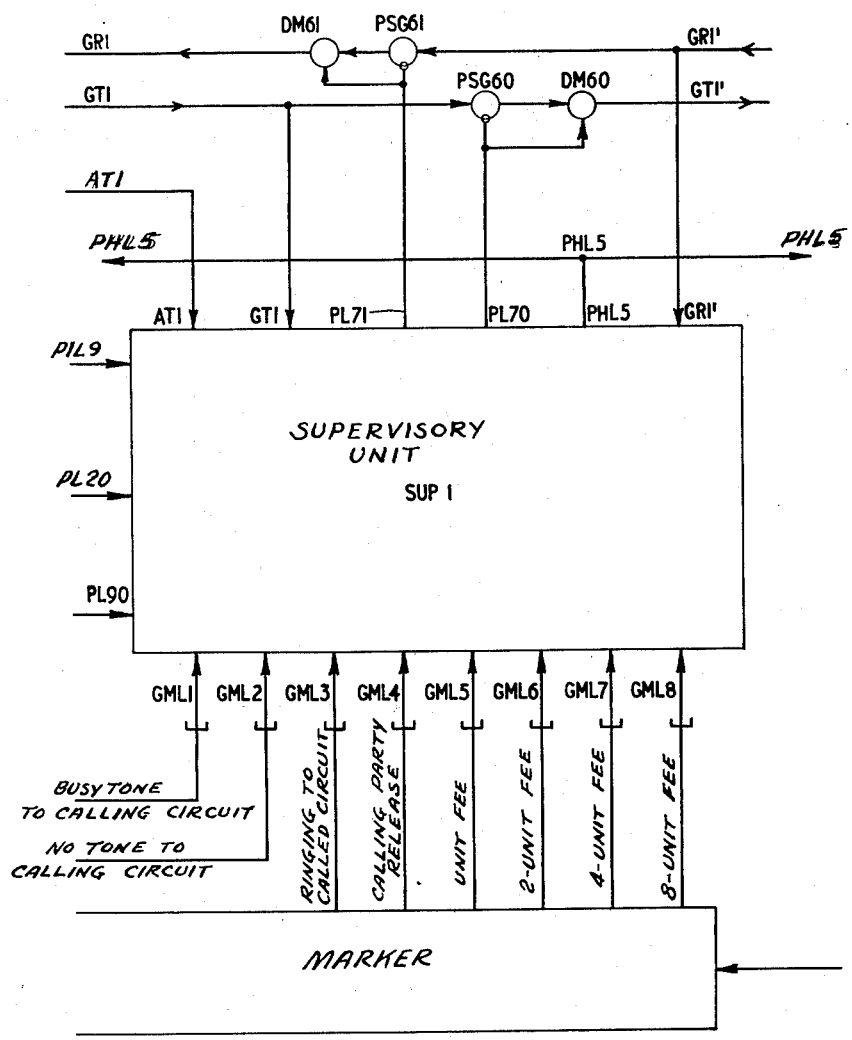

Figs. 5 and 6 includes only those features relevant to the present invention, the features having the same designations as in Fig. 4 of the drawings accompanying the now Pat. No. 2,910,542 issued October 27, 1959.

KEY TO REFERENCES

| Symbol: | Meaning |
|---|---|
| ARC | Audio receive circuit. |
| ATC | Audio transmit circuit. |
| BPF | Band-pass filter. |
| DA | Demodulator-amplifier. |
| DCL | Direct current lead. |
| DM | Decoupling means. |
| GML | Group marking lead. |
| GR | Group receive. |
| GT | Group transmit. |
| H | Hold. |
| ML | Marking lead. |
| PCG | Pulse coincidence gate. |
| PDL | Pulse distributing lead. |
| PG | Pulse gate. |
| PHL | Pulse hold lead. |
| PIL | Pulse indicating lead. |
| PL | Pulse lead. |
| PLM | Pulse lengthening means. |
| PSG | Pulse suppression gate. |
| PSL | Pulse suppression lead. |
| RM | Receive modulator. |
| RU | Rectifying unit. |
| TM | Transmit modulator. |

Figs. 5 and 6 of the accompanying drawings show one circuit CT1 in a group GRP1 of circuits. It incorporates audio receive and transmit pairs ARC1 and ATC1 and hold leads H1 and H2. The audio transmit pair ATC1 is connected with H1 to transmit modulator TM1 which connects ATC1 to the group transmit common lead GT1 when a pulse is applied coincidently on pulse distribution leads PDL1 and PDL2 connected to TM1. Lead GR1, the group receive common lead of group GRP1, is connected to receive modulators provided for each circuit in the group of circuits such as RM1 for circuit CT1. A pulse on GR1 is transmitted through RM1 if it coincides with pulses on both PDL1 and PDL2 connected to it. The output of RM1 is connected via demodulator amplifier and low pass filter indicated collectively by DA1 to ARC1 and a hold signal may be derived in the rectifier unit RU1 to appear on hold lead H2. Corresponding terminal apparatus is provided for each circuit connected to the exchange and any of the circuits may have any pulse train in a set of time spaced pulse trains made effective in the pair of modulators provided for the circuit. GR1 and GT1 form the common lead pair of GRP1 and corresponding leads are provided for each of the other groups in the exchange. So long as a hold signal is applied to TM1 over H1 the pulses appearing coincidently on PDL1 and PDL2 will be transmitted to GT1 and this thus forms an indication of the switchhook condition of the calling subscriber should CT1 be an ordinary subscriber's line. Circuit CT1 may be involved in a connection either as a calling or as a called circuit and in this embodiment therefore the common leads of GRP1 may be used in either direction between calling and called parties.

GT1 is connected via pulse suppression gate PSG60 (Fig. 6) and decoupling means DM60 to GT1¹ forming a pair with GR1¹ which is connected to GR1 via pulse suppression gate PSG61 and decoupling means DM61. Leads GR1¹ and GT1¹ are connected to supervisory unit SUP1 which provides the supervisory facilities on connections to circuits in group GRP1. The presence or absence of a pulse train on GR1¹ indicates the switchhook condition of a calling subscriber's circuit connected to a called circuit in group GRP1 which is using that pulse train for its connection to a calling circuit. SUP1 is connected over PL70 to DM60 and PSG60 such that if a pulse train appears on PL70 it is transmitted to GT1¹ and any coincident pulse train on GT1 is prevented from being so transmitted. Similarly PL71 connects SUP1 to PSG61 and DM61 such that if a pulse train appears on PL71 it is transmitted to GR1 and any coincident pulse train on GR1¹ is prevented from being so transmitted. An output of SUP1 is also connected to PHL5 which lead is used to maintain the connection for as long as required and which appears in Fig. 4 of the drawings accompanying the now Patent No. 2,910,542, issued October 27, 1959 on the output of TD22 whose functions together with those of TD23 are now incorporated in the unit SUP1.

Connected to SUP1 are pulse indicating leads PIL9 and PL20 and PL90. On PIL9 appears the pulse train already in use for the connection between a calling circuit and the register which is attempting to set up the connection between that calling circuit and a called circuit. On PL20 appears the pulse train or pulse trains to be made effective in the modulator pair of the called circuit in GRP1 when such a called circuit is selected for connection by the marker. This will include the pulse train to be used in the connection to the calling circuit.

On PL90 appears only the pulse train to be used for the connection to the calling circuit and not that used by the called circuit for the connection to the register. The indication of this pulse train may be derived from the information indicated as described in the specification of Patent No. 2,910,542 issued October 27, 1959. Thus for connections between circuits in different groups the pulse train appears on PIL14 and this is connected to pulse gate PG95 to which DCIL16 is connected so that if the called circuit's group is GRP1 the calling circuit to called circuit pulse train is transmitted through PG95 to PL90. For a connection between circuits in the same group the pulse train on PL20 may be transmitted to PL90 via PG96 to which the D.C. signal indicating whether the connection is to be between circuits in the same group is connected. Thus for either type of call the pulse train used for connection to the calling circuit may be caused to appear on PL90.

Fig. 5 also shows the transmit lead ATC1 of circuit CT1 connected to band pass filter BPF1, the output of which is connected to rectifying unit RU60. BPF1 is a band pass filter or V.F. receiver which recognises answer tone transmitted over ATC1. All outgoing or bothway junction circuits are equipped with such a receiver capable of detecting answer tone such that if answer tone is generated from another exchange so that it appears on ATC1, it is recognised in BPF1 and a D.C. signal appears on the output of RU60. Answer tone may comprise a single V.F. signal or a combination of V.F. signals. The output of RU60 is connected to gate PG60 such that if said answer tone is received, the pulse train coincidently applied on PDL1 and PDL2 is transmitted through PG60 and appears on common answer tone indicating lead AT1 which is common to all the outgoing or bothway junction circuits of group GRP1. There is thus a pulse indication applied to SUP1 over AT1 of the receipt of answer tone.

Also connected to SUP1 are various D.C. marking leads applied to all the supervisory units in the exchange directly or indirectly from a marker MKR1. These D.C. marking leads indicate the facilities required to be made effective on the connection being set up by the marker. GML1 (Fig. 6) is used to indicate that busy tone must be reverted to the calling circuit; GML2 that N.U. tone must be reverted to the calling circuit; GML3 that the called circuit must receive ringing current; GML4 that the connection through this exchange should be calling party release and GML5, GML6, GML7 and GML8 indicate which of 15 possible fees should be registered against the calling circuit when the called party in this or a distant exchange answers. The 15 different fees are indicated by the 16 possible combinations of signals on GML5–GML8.

When the marker operates to set up a connection, it indicates on lead DCL60 (Fig. 5) that it is so operated. DCL60 is connected via a delay network DL61 to suppression gate SG61 whose output is connected to GML2, The marker also marks the circuit or group of circuits corresponding to the called number information which has been stored in the register to which it is connected. If CT1 is among those circuits, a D.C. marking signal appears on ML1 connected to time division multiplex pulse generator MX5 of GRP1 which generates for all the marked circuits in the group, pulse trains which are individual to the marked circuits as described in the specification of Patent No. 2,910,542 issued October 27, 1959. Thus if there is a marked circuit in GRP1 its pulse train appears on PL5. PL5 is connected to pulse lengthening means PLM60 whose output D.C. indicates whether there is a marked circuit in group GRP1. The outputs of all such pulse lengthening means are connected to common lead DCL61 on which will appear a D.C. signal if any circuit is marked. This lead is connected to SG61 so that if there is a marked circuit the marker operated signal is not transmitted to GML2. If, however, the marker is trying to set up the connection to a spare code or an unobtainable number, no such suppressing signal is derived on DCL61 and GML2 indicates after the delay of DL61 that number unobtainable condition must be transmitted to the calling party.

PL5 is also connected to pulse suppression gate PSG59 to which the pulse trains of any busy circuit in group GRP1 are connected, such that only the pulse trains of free marked circuits in the group are transmitted through PSG59 to PLM11, the D.C. output of which indicates whether GRP1 includes a free marked circuit. The outputs of all such pulse lengthening means are connected via suitable decoupling means to DCL62 connected to SG60. DCL62 indicates whether there are any free marked circuits in the exchange. If there is a signal on DCL61 connected to SG60 indicating that there is a marked circuit, but no signal indicative of a free marked circuit appears on DCL62 then a signal appears on the output of SG60 indicating that busy tone must be reverted to the calling circuit.

If the call fails due to congestion within the exchange it will be clear to those skilled in the art that a signal may be caused to appear on GML1 indicating that busy tone should be transmitted to the calling circuit. Signals on GML3, GML4 . . . GML8 may be derived directly from the marker as a result of the called number information and class of service information held by the register to which it is connected.

*Detailed description and operation of supervisory unit of first embodiment*

The operation of SUP1 will now be described with reference to Figs. 8, 9, 10 and 11 which may be assembled as shown in Fig. 7 to show SUP1. Further subsidiary features of the invention are disclosed by illustration in the following description.

*Busy tone to calling circuit*

It will first be shown how busy tone may be transmitted to the calling circuit as a result of the signal on GML1. GML1 is joined to gates connected to all the storage devices which perform a similar function for each group of circuits. Thus, is it connected to PG81 of GRP1 to which PIL9 is connected so that only if GRP1 is the calling circuit's group does a pulse train appear on PIL9. If GRP1 is the calling circuit's group the calling circuit to register pulse train will be transmitted through PG81 to the input gate PG61 of the mercury storage device (mercury delay line circulating system) TD61 which becomes operated to generate said pulse train on its output control lead PL81 for as long as a coincident pulse train appears on GT1 applied to pulse coincidence circuit PCG61 in the circulating path of TD61. The output of PCG61 is connected to the input gate PG61 of the circulating system. That input gate may incorporate the usual retiming apparatus necessary for the satisfactory operation of mercury delay line circulating systems. The pulse train used by the calling circuit to which busy tone must be reverted is thus set circulating in TD61 and it will appear on PL81 which is connected to modulator M61 which is also connected to a source of busy tone such that the pulse train or pulse trains on the output of M61 is or are modulated by busy tone. That output is connected to PL71 via suitable decoupling means so that the modulated pulses are transmitted to the receive modulator of the calling circuit and busy tone is transmitted to the calling party. Busy tone continues to be so transmitted until the pulse train used by the calling circuit is removed from the group transmit common lead GT1 when the circulation of that pulse train in TD61 ceases.

*Number unobtainable tone to calling circuit*

A number unobtainable signal may be produced on the calling circuit in exactly the same way as busy tone using storage device TD62 to the input gate PG62 of which is connected the output of PG82 to which PIL9 and GML2 are connected.

It will be clear that the insertion, storage and deletion of pulse trains from either of these storage devices can be effected without interfering with the insertion, storage and deletion of any other pulse trains stored therein. This is equally true of any of the storage devices described later. It will also be clear that the lack of signals on either of leads DCL61 or DCL62 may be used to release the marker and subsequently the register, in each case after a delay of sufficient time to allow the above storage devices TD61 or 62 to become operated.

*Ringing of called circuit's bell and ringing tone to calling circuit*

If the marker Fig. 5 and 6 is successful in setting up a connection through the exchange to a called party no operating signal appears on leads GML1 and GML2 but since the called party must be called, an operating signal does appear on GML3 to indicate that the called party's bell or indicator should be rung and that ringing tone should be returned to the calling party. At the same time the pulse train to be used by the called circuit for its connection to the calling circuit and also the pulse train which may be coincident with the former—to be used by the called circuit for its connection to the register, appear on a lead, as PL20 of GRP1, of the called circuit's group. If group GRP1 is the called circuit's group these pulse trains appear on PL20 which is connected to PG83 to which GML3 is connected so that if the called circuit requires ringing current to be transmitted to it, these pulse trains are transmitted through PG83 to PG63 the input gate of storage device TD63. The output of TD63 is connected via a pulse coincidence gate PCG63 back to the input gate of PG63 and a pulse train continues to circulate in TD63 once the latter has been operated to generate the pulse train, so long as a coincident pulse train appears on PHL5 or GR1¹, or until a suppression pulse is applied to PCG63 over lead PL93. The pulse train on PHL5 is stored in another storage device whose operation will be described later but which maintains the calling circuit to called circuit connection GR1¹ is used to maintain the called circuit to register connection until the register releases.

The output of TD63 is connected to modulator M63 to which a source of interrupted ringing tone is applied, so that all the pulse trains stored in TD63 are modulated by the interrupted ringing tone and are transmitted over PL71 to the circuit's receive modulators. The circuit having a coincident pulse train effective in its modulator pair thus receives interrupted ringing tone. The received tone may be used to operate a device which is thus caused to transmit ringing current over the subscriber's line to operate the bell. Further, the transmission of ringing current may be used to cause interrupted and modulated pulses to be transmitted from the called circuit's transmit modulator to the group common transmit lead GT1. Thus while interrupted ringing tone is transmitted to M63 pulse trains will appear on GT1 coincident with those effective in the transmit modulators of called circuits which are being rung. During the interruptions however, no such pulse trains will appear at least after allowance has been made for any end effects at the beginning of the interruptions—until the called party answers when the completion of the answering loop will cause said pulse trains to appear on GT1 until the connection is released or until the called party clears down.

Figure 8:
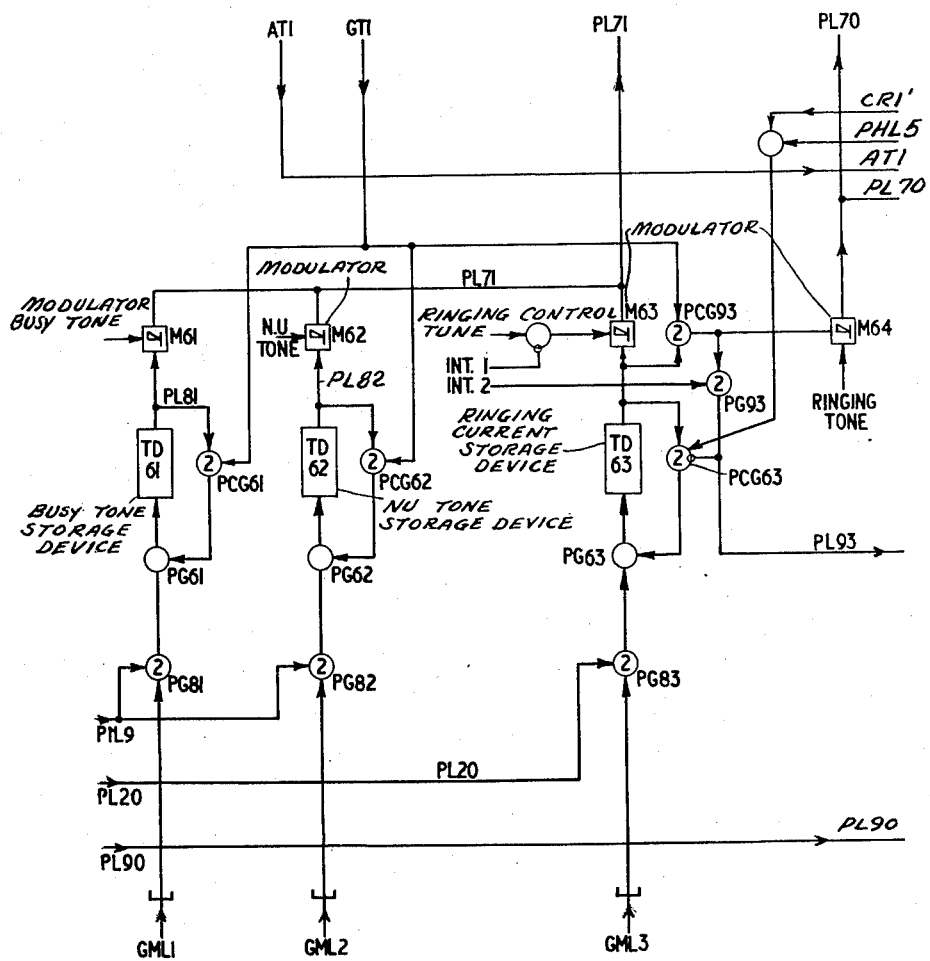

GT1 Fig. 8 is connected to pulse coincidence gate PCG93 to which the output of TD63 is connected such that coincident pulse trains stored in TD63 and appearing on GT1 are transmitted through PCG93. PCG93 is connected to modulator M64 to which a source of ringing tone is connected so that said pulse trains are modulated in M64 and are thence transmitted to GT1[1] Fig. 6 via PL70. Thus the interrupted ringing tone causes interrupted ringing current to be sent to the called circuit and interrupted ringing tone to the calling subscriber and to the register. This method of returning ringing tone to the register performs a checking function on the subscriber's modulator circuits and as soon as the register receives such a check signal it may be caused to release itself from the connection and to free the called circuit to register pulse train should that be different to the calling to called circuit pulse train. Ringing tone is thus transmitted to the calling line for as long as the pulse train used by the called circuit is stored in TD63 or a corresponding storage device in another group.

*Called party answer condition*

The output of PCG93 is connected to coincidence gate PG93 to which a D.C. signal is applied over INT.2 during the interruptions when no pulse trains of called parties appear from PCG93 unless called parties have answered. The interruptions on INT.2 are made longer than those of the ringing tone to allow for the aforementioned end effects. Thus until the called party answers no pulse is transmitted through PG93 but when the answer condition is received a pulse is so transmitted to lead PL93 which is connected to PCG63 to delete the storage of that pulse train from TD63. Thus the ringing is tripped when the called party answers and the pulse on PL93 is an indication of this. The pulse train on GT1 is then no longer transmitted through PCG93 and ringing tone is no longer transmitted to the calling party. Ringing and ringing tone may also be cut off by removal of the pulse train applied to PCG63 on PHL5 which occurs when the calling party clears down.

The pulse appearing on PL93 is applied to PG64, the input gate of storage device TD64. The output pulses from TD64 are applied via maintaining pulse coincidence gate PCG64 to PG64. Thus, provided that a pulse train appears on PHL5 connected to PCG64 which coincides with that stored in TD64 the storage of said pulse trains continues unless a coincident suppression pulse is applied to PCG64 over PL86. Thus when a called party connected to GRP1 answers, the pulse train used for the connection on the group common lead pair is set circulating in TD64.

The output of TD64 is connected to coincidence gate PCG74 which is opened at intervals by a pulse train applied to it of pulse duration greater than the pulse repetition time of the speech connection pulse trains. The pulse trains stored in TD64 transmitted through PCG74 are applied to the input gate PG65 of storage device TD65. These pulse trains are stored in TD65 using the circulation path via maintaining gate PCG65 to which the pulse hold lead PHL5 is connected. The output of PCG65 is thus connected to the input gate PG65 of TD65 and is also connected to PCG86 which is opened at intervals by a pulse train applied to it, which has a pulse duration and repetition frequency similar to that applied to PCG74 and which is a version of that pulse train delayed by any desired time, say, 200 milliseconds, said time being less than the repetition time of either of said pulse trains. The output lead PL86 of PCG86 is connected to PCG64 so that a pulse of a pulse train transmitted through PCG86 deletes any coincident pulse train from storage device TD64. The outputs of storage devices TD64 and TD65 are connected to pulse coincidence gate PCG85 from which a pulse train is emitted only during the period when it is stored in both storage devices i.e. for the 200 milliseconds or other period between the two pulses of pulse trains applied to PCG74 and PCG86 and only then provided no coincident suppression pulse train appears on lead PL84 connected to PCG85. The pulse train is inhibited by that on PL84 if the metering information relating to the connection is held within this exchange. The output of PCG85 is connected to modulator M65 to which a source of answer tone is applied so that all the pulse trains transmitted through M65 are modulated by answer tone and are transmitted over PL70 to the common lead GT1[1] so that answer tone is transmitted towards the calling party. Thus a controlled burst of answer tone, say, 200 milliseconds in duration is transmitted to indicate that the called party has answered, unless the metering information is held in this exchange, as it will be, for example, on a local call. After the pulse train has been deleted from TD64, it is still stored in TD65 and the fact that a pulse train is stored in either of these devices indicates that the called party using that pulse train has answered. The outputs on both TD64 and TD65 are connected via means decoupling DM61 to indicate this.

When a connection is established through this exchange to an outgoing junction, it is not required to ring the called circuit from this exchange, and no answer signal will appear on lead PL93. Instead, an answer signal is received from another exchange, and may be generated as described and the pulse train used by the called circuit in this exchange will appear on AT1 which is connected to pulse coincidence gate PCG84. If a coincident pulse train is applied to PCG84 on lead PL84 indicating that metering is to take place within this exchange, this pulse train is transmitted through PCG84 to PG64 the input to TD64. The pulse train will then be stored in either TD64 or TD65 as previously described, thus indicating on the output of DM61 that the called party has answered. Also as described no answer tone is transmitted by M65 since the signal on PL84 will prevent the transmission of the pulse train through PCG85.

*Tandem exchange condition*

In the event of this exchange being used as a tandem exchange on a connection and not involved in the metering of the call, no pulse train is transmitted to TD64 through PCG84 and answer tone is transmitted directly over the exchange transmission means from one junction circuit to the other. It will be clear that the supervisory unit could be adapted to repeat the answer tone signal, if required, by omitting gate PCG84.

*Metering*

Figure 10:
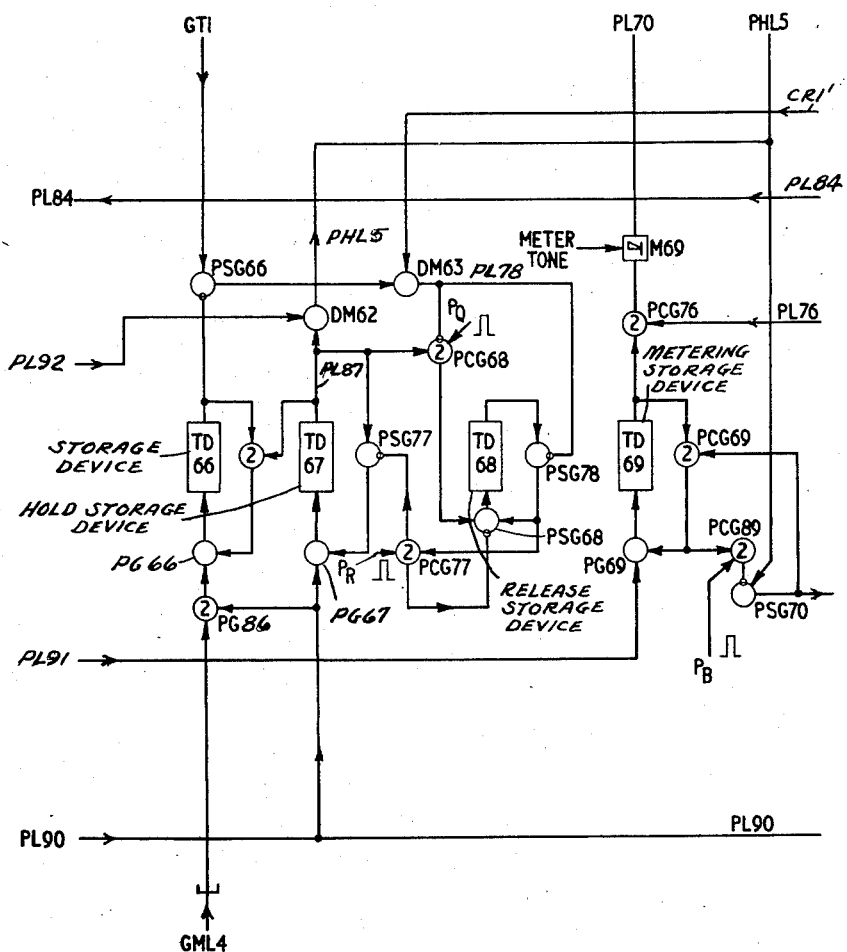
Figure 11:
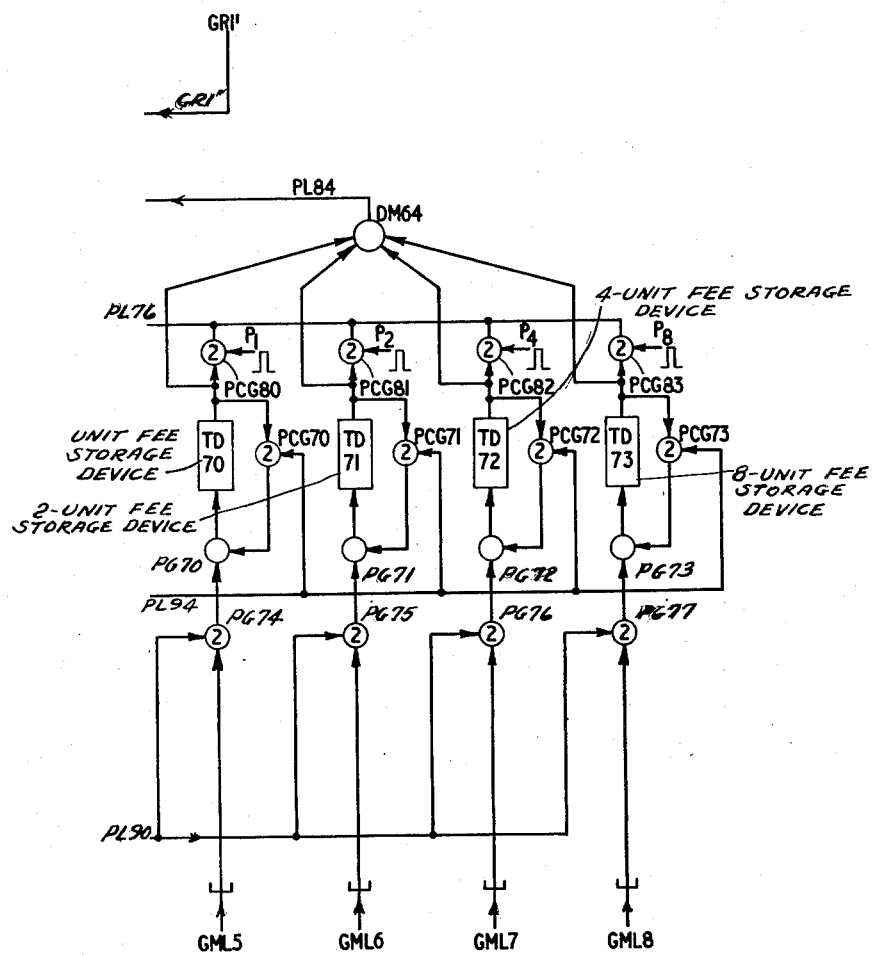

The metering of the call, when this is to be effected in the exchange being considered is achieved using the storage devices TD69 to 73 Figs. 10 and 11.

When the connection is being set up, the register and/or marker provides a D.C. signal on some or all of the leads GML5, GML6, GML7 and GML8 Fig. 11 and these signals cause the pulse train on PL90 to be used to the called circuit to be stored in corresponding storage devices TD70, TD71, TD72 and TD73 Fig. 11 of the called circuits group. These four storage devices are used to remember the number of units of the fee to be registered against the calling party. Thus a pulse train stored in TD70 indicates unit fee, in TD71 2 unit fees, in TD72 4 unit fees and in TD73 8 unit fees. By the use of combinations of these devices any fee from 1 to 15 units may be charged. The storage of pulse trains in said devices is maintained by the connection of the pulse hold lead PHL5 via pulse suppression gate PSG70 to maintaining PSG70, Fig. 10 to coincidence gates PCG70, 71, 72 and 73 Fig. 11 provided for each of the four storage devices. Thus PHL5 is connected via PSG70 Fig. 10 to pulse coincidence gate PCG 70 Fig. 11 to which the output of TD70 is connected. The outputs of TD70—TD73 are connected via decoupling means DM64 to PL84 and the presence of a pulse train on this lead indicates that the metering for the call using this pulse train is controlled from this exchange.

Figure 9:
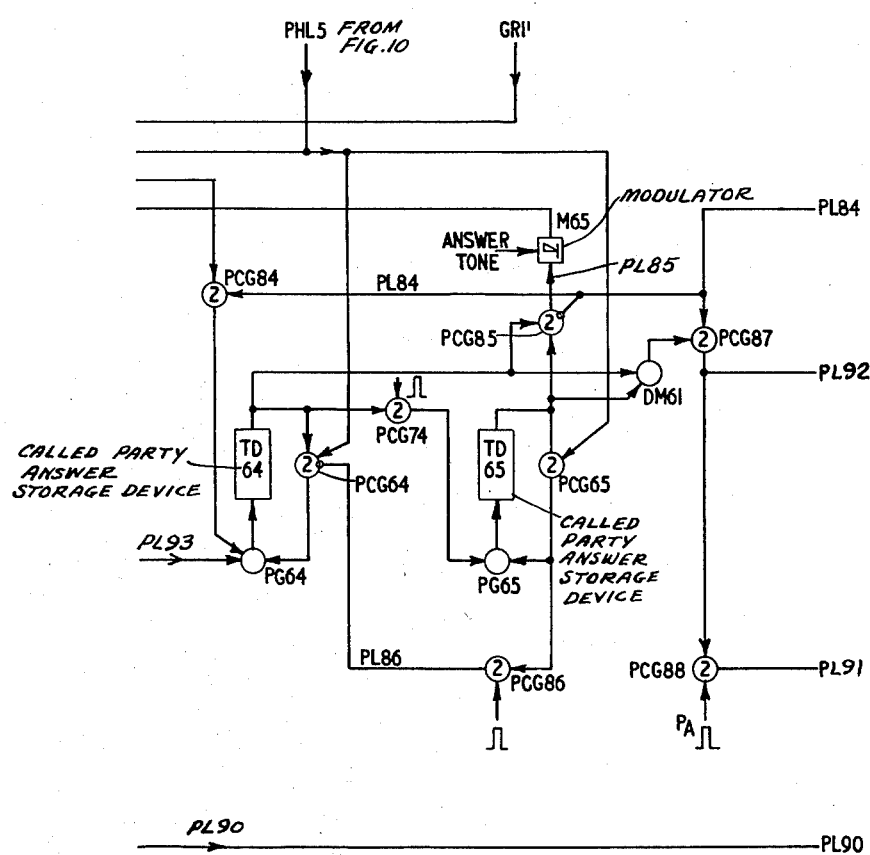

The output of DM61 Fig. 9 which indicates that the called party has answered, is connected via a coincidence gate PCG87 Fig. 9 to which PL84 is also connected to PCG88 Fig. 9 to which a long pulse PA is applied at intervals. The long pulse transmits pulses of all the pulse trains appearing on the output lead PL91 of DM61 to the input gate PG69 Fig. 10 of storage device TD69 Fig. 10 which becomes operated to generate those pulse trains on its output lead so long as the metering information indication appears on PL84. The storage of pulse trains in TD69 is also maintained by the presence of coincident pulse trains on the output of PSG70 Fig. 10 connected to PCG69 Fig. 10. After an interval, a long pulse on $P_B$ applied to gate PCG89 Fig. 10 to which the output of PCG69 is also connected, transmits pulses of all the pulse trains stored in TD69 to pulse suppression gate PSG70 thus inhibiting on the output of PSG70 the coincident maintaining pulses on PHL5 and causing those pulse trains stored in TD69 to be deleted from TD69, TD70, TD71, TD72 and TD73 Fig. 11 so that the metering is terminated. The metering is effected during the period between a pulse $P_A$ and a pulse $P_B$ and as just described, the pulse train of a connection to a called circuit in GRP1 is stored in TD69 Fig. 10 for just one such period of the pulse duration of $P_A$ and $P_B$ is greater than the repetition time of a connection pulse train.

The specification of copending patent application Serial No. 355,628, filed in the name of T. H. Flowers and F. Scowen describes a method of operating a subscriber's meter and this invention may be simply adapted thereto.

The outputs of TD70, TD71, TD72 and TD73 Fig. 11 are connected to gates PCG80, PCG81, PCG82 and PCG83 respectively, to which pulse trains $P_1$, $P_2$, $P_4$ and $P_8$ are applied respectively. The pulse train $P_1$ is such that in the period between a pulse on $P_A$ and $P_B$, one pulse of $P_1$ is generated; the pulse train $P_2$ is such that in said period two pulses of $P_2$ are generated; the pulse train $P_4$ is such that in said period four pulses of $P_4$ are generated and the pulse train $P_8$ is such that in said period eight pulses of $P_8$ are generated. These pulses are arranged so that the duration of each is greater than that required to operate a meter, say, 150 milliseconds and so that they would have a repetition time of, say, 100 milliseconds if they all appeared on one lead.

The outputs of PCG80, PCG81, PCG82 and PCG83 are all connected to pulse lead PL76 on which will appear bursts of the pulse trains stored in the metering storage devices. If a pulse train is stored in TD70, TD72 and TD73 there will thus be 1+4+8 bursts of that pulse train on PL76 in each $P_A$ to $P_B$ interval, corresponding to 13 units of fee to be registered against the calling party which the marker would have indicated as being required using leads GML5, GML7 and GML8. PL76 is connected to pulse coincidence gate PCG76 Fig. 10 to which the output of TD69 is also connected so that during the $P_A$ to $P_B$ interval when a pulse train is stored in TD69 the bursts of said pulse train appearing on PL76 are transmitted through PCG76 to modulator M69 to which a source of meter tone is applied such that the bursts of pulse trains so transmitted are modulated with meter tone and transmitted to PL70 and thence as bursts of meter tone to the calling party's apparatus in this or a neighbouring exchange. Having sent one cycle of metering bursts the pulse trains are deleted from the metering storage devices as previously described. The maximum rate at which metering bursts are transmitted using the time herein suggested, is 4 per second and it therefore takes nearly 4 seconds to send all the metering information of a call to the calling party's apparatus. The pulse repetition time of $P_A$ and $P_B$ may thus be about 4 seconds and $P_A$ may succeed $P_B$ as rapidly as possible provided that they do not overlap.

*Called party answered, both parties clear down before metering has taken place*

It is possible for the called party to answer and then for both parties to clear before metering has taken place. This would remove the hold pulse trains from PHL5 and thus terminate the metering. In order to ensure that if the called party answers, the fee is registered against the calling party, the connection may be held by the coincidence of the metering pulse train indicated by PL84 and the called party answer indication on the output of DM61 Fig. 9. Thus the output lead PL92 of PCG87 Fig. 9 to which these leads are connected, is connected via decoupling means DM62 Fig. 10 to PHL5. Thus until the pulse train is deleted from the metering storage devices the connection cannot be cleared down until the charge has been registered. Clearly this facility is by no means essential but could be adopted if necessary. It has the disadvantage that neither party can commence another call for a period of from 4 to 8 seconds using the times herein considered.

*Holding and release of connections*

The storage devices TD67 and TD68 Fig. 10 are concerned respectively with the holding and the release of connections. The storage device TD66 Fig. 10 is used to hold the connection when it is calling party release and when the connection is held both forward towards the called party and backwards towards the calling party from this point. When TD66 is not used i.e. when there is no marking signal on GML4 when the connection is set up, the connection is held by either party and this facility is useful on tandem calls when the connection releases from the terminating exchange and also, for example, when the connection is to a manual board when it is desirable that the call should be held by the operator.

When the connection to a called circuit is established the pulse trains to be used by it are applied on lead PL90 to storage device TD67 Fig. 10 if said called circuit is in GRP1. TD67 is thus operated to generate on its output lead PL87 those pulse trains used by called circuits in group GRP1 for connections to calling circuits. Its output lead PL87 is connected via DM62 to PHL5 where it is used to hold the connection as described in the specification of copending application No. 471,072 and to maintain the storage of the pulse trains in the storage devices. A pulse train continues to be stored in TD67 until it is deleted by a coincident pulse applied as an inhibition to PSG77 in the circulating path TD67. The output of TD67 is connected to a gate PCG68 to which a pulse train $P_Q$ is applied so that pulse trains stored in TD67 are transmitted through PCG68 when a pulse of $P_Q$ is applied and then only if no coincident suppressing pulse is applied to PCG68 on lead PL78. Lead $GR1^1$ is connected to PL78 via decoupling means DM63 and pulse indicates the switchhook condition of the calling circuit. GT1 which pulse indicates the hold condition of the called circuit is also connected to PL78 via suppression gate PSG66 and decoupling means DM63. The output of TD66 is connected as an inhibition to PSG66 so that if there is a coincident pulse train stored in TD66 indicating that the connection is held by the calling party only, the coincident pulse train on GT1 is not transmitted through PSG66 and only appears on PL78 so long as the calling party holds the connection. A pulse train is only stored in TD66 if the D.C. marking condition on GML4 from the marker opens gate PG86 to transmit the pulse train on PL90 to the input gate PG66 of TD66. The storage of the pulse trains in TD66 is maintained by applying coincident pulse trains stored in TD67 to the maintaining gate PCG67 of TD66. Thus in either case only if PL78 indicates that the connection should be released are the pulses on the output lead PL87 of TD67 transmitted through PCG68 by a pulse of $P_Q$ to operate TD68 via PSG68. Pulse trains set circulating in TD68 in the manner described, remain stored therein unless deleted by the reappearance of the pulse train on lead PL78 connected to suppression gate PSG78 until a pulse of $P_R$ applied to pulse coincidence gate PCG77 transmits pulses stored in TD68 to pulse suppression gate PSG77 and PSG68 thus deleting coincident pulse trains from the storage devices TD67 and TD68 and releasing the connection. The duration of the pulses $P_Q$ and $P_R$ must be greater than the pulse repetition time of the speech pulse trains and must have a repetition time greater than the length of spurious breaks or dialling impulse breaks likely to remove the pulse trains from PL86 Fig. 9. Thus the pulse trains must disappear from PL78 for at least the period between $P_Q$ and $P_R$ pulses, before the connection using that pulse train releases. This period may be, for example, 500 milliseconds. Thus the connection between parties may be released either by last party to release or by the calling party as indicated by the marker. Clearly the time interval between a $P_R$ pulse and a $P_Q$ pulse may be made as short as possible provided that they do not overlap.

The foregoing has described one embodiment of the invention incorporating some of its applications and some of the ways of carrying it into effect. The invention may be used to effect a wide variety of facilities. For example, such facilities as trunk offering, delayed ringing, called subscriber held, time out and release and variable rate metering may be provided using the invention. Economies can be made in the number of storage devices required by using different combinations of storage devices to perform different functions. Thus provided that there are, say, 7 mutually exclusive possible states of a connection, only 3 storage devices are required in which case there is a different combination for each state and by suitably arranging gate circuits, modulators and the like the invention may be more economically carried into effect. Since each connection uses two group common lead pairs and each pair is provided with a supervisory unit the control functions may be split between the two, such that some facilities are carried out on the calling side and some on the called side of the connection. Such a scheme is indicated diagrammatically in Figs. 3A, 3B, 3C. Using another storage device to indicate whether a pulse train is being used by a calling circuit or a called circuit in the associated group, the same storage devices may be used for more than one purpose. With such an additional storage device for example, the storage devices TD61 and 62, Fig. 8, used for N.U. and busy tones on the calling side could be used to perform the functions of TD63, Fig. 8, and TD64, Fig. 9, when on the called side. Furthermore, in the above described embodiment all the storage devices indicate information at the pulse repetition frequency of the speech connection pulse trains. This, however, is not essential in some cases for example TD68, Fig. 10, requires an output only once and much later than its input and by allocating each group or facility with a pulse train individual to it but which coincides with every speech connection pulse train once every N cycles and by using storage devices of greater storage capacity (N times) they may be made common to either, more than one group, or more than one facility, thus effecting an economy in storage device amplifiers etc. It will be clear to those skilled in the art that there are many alternative ways of carrying the invention into effect.

*Detailed description of supervisory unit of second embodiment*

An arrangement of the supervisory unit SUP1 of Figs. 5 and 6 will now be described with reference to Figs. 13, 14, 15, 16 and 17 in which the above techniques for achieving storage device economy are used. Figs. 13, 14, 15 and 16 are assembled in accordance with Fig. 12.

As already described one economy arises from the fact that a circuit in the group associated with the supervisory unit may be either a calling or a called circuit and in the embodiment of Fig. 12 some storage devices are used to perform different functions depending upon whether they are on the calling or the called side. A second economy arises from the fact that the information stored in the storage devices need not always be made available at the frequency of the channel pulse trains used on the group common lead pairs. Thus in the embodiment of Figs. 13, 14, 15 and 16 some of the information is stored in devices common to more than one group and connected to the groups by gate circuits pulsed by a pulse train individual to the group. A further economy is obtained by using the common storage devices to store information for more than one type of facility as well as for more than one group. A further economy is obtained by arranging that mutually exclusive functions are performed by different combinations of storage devices. These economies will be made clearer by the following description of a unit which performs those functions performed by the embodiment of Fig. 7.

The embodiment includes three storage devices TD101, TD102 Fig. 13 and TD103 Fig. 13 individual to GRP1. These storage devices are only used for tone sending, all the other functions being performed by the common apparatus storage devices TD105, TD106 Fig. 15, TD107 Fig. 16, TD108 and TD109 Fig. 16. The group supervisory storage devices have a storage capacity equal to the number of channel pulse trains which will here be assumed to be 100 and may for example be 100 microsecond delay line circulating systems for 10 kc./sec. channel pulse trains. The common supervisory storage devices have a storage capacity equal to the number of channel pulse trains multiplied by the number of facilities performed by each storage device multiplied by the number of groups to which the common supervisory apparatus is connected. If the common supervisory apparatus is common to three groups and each storage device controls two facilities the capacity required would be 600 for 100 channel pulse trains and they may be 600 microsecond delay line circulating systems.

Figure 17:
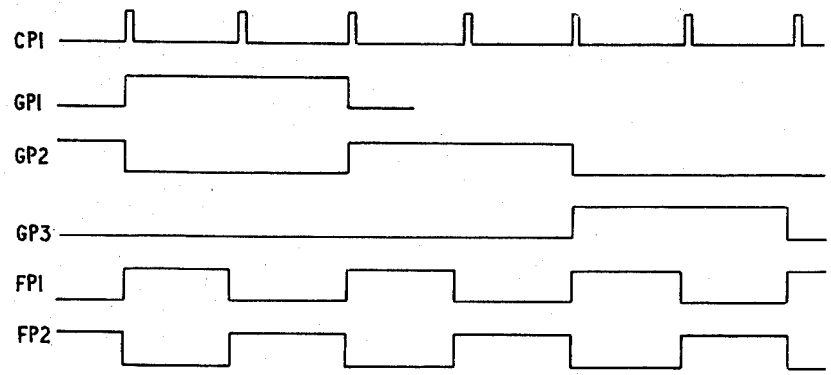
Fig. 17 shows the waveforms of pulse trains used in the second embodiment.

In order to make use of these techniques two sets of pulse trains are required, firstly, a set of group pulse trains and secondly, a set of facility pulse trains, the sets being so arranged that in a complete cycle each group pulse train coincides with each channel pulse train at times coincident with each of the facility pulse trains. Thus, for the above case, and as shown in Fig. 17 the set of group pulse trains could comprise three pulse trains GP1, GP2 and GP3 each of 200 microseconds duration and 600 microsecond repetition frequency time and the set of facility pulse trains could comprise two pulse trains FP1 and FP2 each of 100 microsecond duration and 200 microsecond repetition time, with the leading edges of pulses of the first group pulse train, GP1 of the first facility pulse train FP1 and of the first channel pulse train CP1 being coincident.

The functions of the various storage devices will now be described in general terms for a particular channel pulse train used on a connection involving a circuit in GRP1. TD101 Fig. 13 is used to remember if the circuit of GRP1 is the calling circuit, the pulse train being stored in TD101 if it is. TD102 Fig. 13 is used for the sending of busy tone to the calling circuit if it is in GRP1 and TD103 Fig. 14 is used for the sending of N.U. tone to the calling circuit if it is in GRP1. TD102 Fig. 13 is used to send ringing tone to the called circuit and ring tone to the calling circuit if the former is in GRP1 i.e. if the channel pulse is not in TD101, and also if the channel pulse is not in TD103. TD103 Fig. 14 is used to send answer tone to the calling circuit if the channel pulse is not in TD101 or in TD102. If the pulse is not in TD101 but is in both TD102 and TD103 meter tone is transmitted to the calling circuit. TD105 Fig. 15 at times FP1 is used to remember that the called subscriber has answered and corresponds to TD64 of Fig. 9. TD105 and TD106 Fig. 15 at times FP1 are used to control the sending of answer tone by TD102 and perform functions corresponding to TD64 and TD65 of Fig. 9. TD106 Fig. 15 at times FP1 is used to remember that answer tone has been transmitted. TD107, TD108 and TD109 at times FP1 perform releasing functions corresponding to those of TD66, TD67 and TD68 of Fig. 10. TD105, TD106 Fig. 15, TD107, TD108, and TD109 Fig. 16 at times FP2 perform metering functions corresponding to TD69 Fig. 10, TD70, TD71, TD72 and TD73 of Fig. 11. To transfer information within the common supervisory apparatus from time FP1 to time FP2 two delay lines are provided, D110 and D111 Fig. 16, each of 100 microseconds delay so that a channel pulse at the time of a group pulse at facility pulse FP1 if inserted into D110 or D111 reaches the output at the time of the channel pulse at the time of a group pulse at facility pulse FP2.

*Detailed description of operation of second embodiment*

The operation of the arrangement of Figs. 13, 14, 15 and 16 will now be described in more detail and with reference also to the descriptions of Figs. 8, 9, 10 and 11 where operations are identical in the two cases.

As in Fig. 8 GML1 is connected to PG81 so that the channel pulse on PIL9 of the calling circuit's group is transmitted through PG81 Fig. 13 and PG61 to the input decoupling means DM108 of TD102. PIL9 is also connected to the input gate PG107 of TD101 where the channel pulse is stored via PCG103 for as long as the pulse appears on GT1 connected to PCG103. The output of TD102 is connected to pulse coincident gate PCG101 and pulse suppression gate PSG101 to which the output of TD101 is connected as an operate and as a suppression stimulus respectively. The output PL81 of PCG101 corresponds exactly to PL81 of Fig. 8 and is connected to M61 where the stored pulses are modulated with busy tone and transmitted over PL71. The recirculation path of TD102 is completed via PCG61, PG61 and DM108 Fig. 13.

Similarly GML2 is connected to PG82 Fig. 13 to which PIL9 is connected as before so that a channel pulse to be modulated by N.U. tone is transmitted through PG82, PG62, the input decoupling means DM110, TD103 and via PCG102 to which the output of TD101 is connected as an operate lead to N.U. modulator M62 Fig. 13 and recirculation gate PCG62 Fig. 13 to which GT1 is connected.

GML3 is connected to PG83 Fig. 13 to which PL20 is connected so that a channel pulse to be used in ringing a called subscriber in GRP1 is transmitted through PG83, PG63, the input decoupling means DM110 to TD102 whose output pulse is transmitted through PSG101 since the channel pulse is not now circulating in TD101. The output of PSG101 is connected via PSG131 on the suppression lead of which no coincident pulse appears at this stage, to M63 and PCG93 whose functions together with those of PG93, PCG63, PG63 and M64 are precisely those described for Fig. 8. The output of PG93 Fig. 13 is connected together with AT1 via decoupling means DM101 to the input of pulse coincidence gate PCG105 to which GP1 is applied so that on the output lead PL105 of PCG 105 which output is common to all three groups appears the GP1 pulses of the channel pulse train when either the rung subscriber answers or when answer tone received is indicated over AT1.

Figure 15:
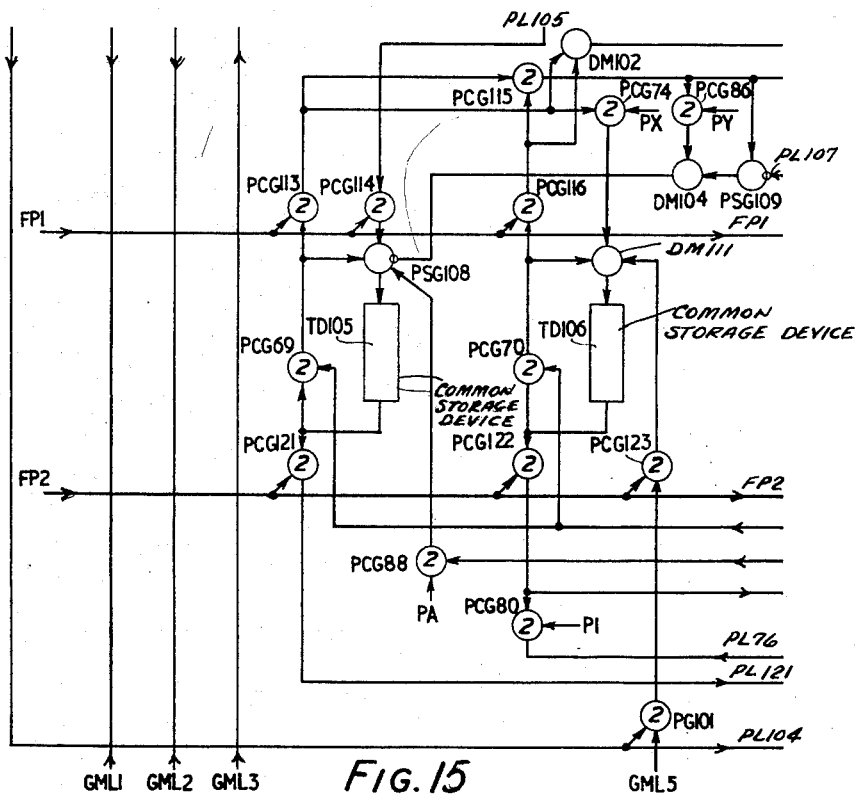

The output lead PL105 of PCG105 is connected to pulse coincidence gate PCG114 Fig. 15 to which FP1 is applied so that the output has pulses of the channel pulse only coincident with GP1 and FP1. The output of PCG114 is connected via PSG108 to the input of TD105 whose output is connected to recirculation gate PCG69 to which a coincident hold pulse is applied so that the version of the channel pulse is stored in TD105. The FP1, GP1 stored version of the channel pulse train is transmitted through PCG113 Fig. 15 to which FP1 is applied and thus gives an indication that answer tone has been received and stored.

The output of PCG113 is connected to PCG74 whose function is the same as that of PCG74 in Fig. 9 except that it serves more than one group. The output of PCG74 is connected to the input decoupling means DM111 of TD106 forming a circulation system via PCG70 to which hold pulses are applied. Thus after a coincident operating pulse PX has been applied to PCG74 the version of the channel pulse train is stored in TD106 at FP1 and is gated through PCG116 to which FP1 is applied. The outputs of PCG113 and PCG116 are connected to pulse coincidence gate PCG115 so that the version of the channel pulse train appears on the output of PCG115 so long as it is stored in both TD105 and TD106. This output is connected via DM103 Fig. 16 to gates provided one for each group to which the group pulse train as GP1 is applied. Thus the output lead PL106 of DM103 Fig. 16 is connected to PCG106 Fig. 14 for GRP1 to which GP1 is applied so that the version of the pulse train is gated through PCG106 and DM110 to the input of TD103 Fig. 14 and thence via PSG102 to which the output of TD101 Fig. 13 is applied as a suppression and via PSG132 to which the output of PSG101 is applied as a suppression. The output of PSG132 is connected to M65 Fig. 14 whence the stored pulses in TD103 are modulated by answer tone and transmitted over PL70. The output of PSG132 is also connected via PSG104 back to the input decoupling means DM110 of TD103, this circulation being broken at every GP1 pulse which is applied to PSG104 as a suppression. The output of PSG132 is also connected to pulse coincidence gate PCG107 to which GP1 pulses are applied. The output lead PL107 of PCG107 common to all groups gives a GP1 version of the channel pulse stored in TD103 and is connected via pulse suppression gate PSG107 Fig. 16 to DM103 and thence back on lead PL106 to PCG106 Fig. 14 providing an alternate circulating path for TD103 to that via PSG104. As will be described later if meter information is held within the exchange a FP2 version of the pulse appears on PL84 connected to PSG107 Fig. 16 thus deleting the storage of the pulse from TD103. If no pulse appears on PL84 the storage continues in TD103 and answer tone is transmitted to line. The output of PCG115 Fig. 15 is connected to pulse suppression gate PSG109 Fig. 15 which has the common output PL107 of PCG107 Fig. 14 connected as a suppression lead. If the FP2 pulse on PL84 has deleted the pulse from TD103 then on the next FP1 pulse, the pulse is transmitted through PSG109 Fig. 15 and thence via DM104 Fig. 15 deletes the pulse stored at FP1 in TD105 thus preventing any further pulse from being stored in TD103 Fig. 14 from PCG115 Fig. 15. If no meter information is stored, the pulse continues to appear on the output lead PL107 of PCG107 and the pulse is not deleted from TD105 Fig. 15 until a pulse is transmitted from PCG86 Fig. 15 via DM104 to PSG108; the function of PCG86 Fig. 15 being as already described above relative to Fig. 6. Thus depending upon whether meter information is held in the exchange, the burst of answer tone may be sent.

If the answer has been received the FP1 channel pulse at GP1 is stored in either TD105 or TD106 Fig. 15 and the outputs of PCG113 Fig. 15 and PCG116 Fig. 15 are connected via decoupling means DM102 to the input of delay line D110 on whose output a FP2 version of the pulse appears when the called subscriber has answered.

GML5 Fig. 15, GML6, GML7 and GML8 Fig. 16 are connected to pulse gates PG101 Fig. 15, PG102, PG103 and PG104 Fig. 16 respectively to which PL90 Fig. 13 is connected via PCG104 Fig. 13 to which GP1 Fig. 13 is applied so that the GP1 version of the channel pulse appears on lead PL104 Figs. 13, 14, 15 and 16 and on the outputs of PG101—PG104 Figs. 15 and 16 when GML5—GML8 are marked. The outputs of PG101—PG104 are connected to pulse coincidence gates PCG123, Fig. 13, PCG125, PCG127 and PCG129 Fig. 16 respectively to which FP2 pulses are applied and whose outputs are connected to the inputs DM111, DM107, PSG110 and PSG77 of TD106—TD109 Figs. 15 and 16 respectively. Thus the meter information is stored in those storage devices at time FP2 and the outputs of TD106 to TD109 Figs. 15 and 16 are connected to PCG122 Fig. 15, PCG124, PCG126 and PCG128 Fig. 16 respectively to which FP2 is applied so that on the outputs of these gates FP2/GP1 versions of the channel pulses are used to indicate the meter information which has been stored. All these outputs are connected via DM64 Fig. 16 to PL84 Fig. 16 and are respectively connected to PCG80 Fig. 15, PCG81, PCG82 and PCG83 Fig. 16 which operate precisely as for Figs. 10 and 11 and which deliver pulses to PL76.

PL84 Fig. 16 is connected to pulse coincidence gate PCG87 Fig. 16 to which the output of D110 Fig. 16 is also connected so that if the meter information is held in this exchange, when the called subscriber has answered, a FP2/GP1 version of the channel pulse train is transmitted to the input of PCG88 Fig. 15 which operates exactly as in Fig. 9. When a pulse is transmitted through PCG88 Fig. 15 it is stored via PSG108 Fig. 15 in TD105 Fig. 15 at FP2 and is indicated on lead PL121 via PCG 121 Fig. 15 to which FP2 is applied. While the pulse is so stored the meter pulses on PL76 are used to initiate the sending of meter tone as follows. The output lead PL121 of PCG121 Fig. 15 and PL76 Fig. 15 are connected to pulse coincidence gate PCG 76 Fig. 16 whose output PL111 Fig. 16 is connected to pulse coincidence gates provided one for each group PCG111 for GRP1 Fig. 14. Thus the GP1 pulse is transmitted through PGC111 to which GP1 is applied and whose output is connected via PG111 Fig. 14 to the input decoupling means DM108 and 110 of TD102 and TD103. The output pulse is transmitted through PSG101 Fig. 13 and PSG102 Fig. 14 but is inhibited from being transmitted through PSG131 and PSG132. The output of PSG101 and PSG102 are connected to pulse coincidence gate PCG131 Fig. 13 on whose output PL131 will appear the channel pulse train if it is to be modulated by ring tone. The output PL131 is connected to M69 Fig. 14 and also to pulse suppression gate PSG103 Fig. 14 and thence back via gate PG111 to the input decoupling means DM108 and 110 of TD102 and TD103. The inhibiting pulse train applied to PSG103 Fig. 14 is a version of GP1 at FP2 and the circulation path is broken at every such pulse. Only is the recirculated pulse from PSG103 Fig. 14 replaced by a pulse from PCG111 Fig. 14 while pulses of P1, P2, P3 and P4 are applied to PCG80, PCG81, PCG82 and PCG83 Fig. 16 associated with the storage devices in which FP2 versions of the channel pulse are stored. Thus bursts of meter tone are transmitted to line approximately equal in duration to the P1, P2, P3 and P4 pulses. When a PB pulse occurs, applied to PCG89 Fig. 16 to which the output PL121 of PCG121 Fig. 15 is also connected, the FP2 hold pulses to PCG69, PCG70 Fig. 15 PCG71 and PCG73 Fig. 16 are suppressed in PSG70 to which the output of PCG89 is connected.

It remains to be shown how the connection is held in this embodiment. FP2 pulses are applied to PSG106 Fig. 16 whose output PL109 is connected to pulse coincidence gates provided one for each group. Thus it is connected to PCG109 Fig. 14 to which GP1 is applied and whose output is connected to pulse suppression gate PSG105 Fig. 14 as a suppression lead. Timing pulses K6 coincident with all channel pulses are applied to PSG105 Fig. 14 and these are transmitted to PHL5 until a suppression pulse is applied to PSG105 Fig. 14 i.e. until a suppression pulse is not applied to PSG106 at FP2 Fig. 2.

When the connection is set up the channel pulse at GP1 is applied from the output PL104 of PCG104 Fig. 12 to pulse coincidence gate PCG120 Fig. 16 to which FP1 pulses are applied. The output of PCG120 Fig. 16 is connected to the input gate PSG110 of TD108 in which the FP1/GP1 version of the channel pulse train becomes stored using the circulation path PCG72, PSG110 and TD108 Fig. 16. This version of the pulse train is indicated on the output of PCG119 Fig. 16 to which FP1 pulses are applied and this output is connected to PSG 70 Fig. 16 both directly and via D111 Fig. 16 so that on the output of PSG 70 Fig. 16 will appear FP1 and FP2 versions of the channel pulse train stored in TD108 Fig. 16 at FP1 unless a coincident pulse appears on the output of PCG89 Fig. 16 as already described. The output of PSG70 Fig. 16 is used to maintain the storage in timing devices TD105, TD106 Fig. 15, TD107, TD108 and TD109 Fig. 16.

GML4 indicating that the connection is to release when the calling party clears is connected to PG66 Fig. 16 to which the output PL104 of PCG104 Fig. 13 is connected and whose output is connected to PCG118 Fig. 16 to which FP1 is applied so that the FP1/GP1 version of the channel pulse is transmitted via DM107 to TD107 Fig. 16 where it is stored using circulating path PCG71. This version of the pulse train is indicated on the output of PCG117 Fig. 16 to which FP1 is applied and this output is applied to pulse suppression gate PSG66 Fig. 16. GT1 indicating the hold condition from the called party is connected to PCG108 Fig. 14 to which GP1 is applied and the output of this gate which is common to the gates provided for all three groups is connected via PL108 to PSG66 Fig. 16. GR1¹, Fig. 14 is similarly connected to a common lead via PCG110 Fig. 14 to which GP1 is applied and the output of PSG66 Fig. 16 and the common output PL110 from PGC110 are connected via decoupling means DM63 Fig. 16 to pulse coincidence gate PCG130 Fig. 16 to which FP1 is applied. Thus while the hold condition is appearing on GR1¹ or on GT1 except when the release is controlled only by the calling party, a GP1/FP1 version of the channel pulse appears upon the output of PCG130 Fig. 16. This lead corresponds exactly to the output of DM63 in Fig. 10 and the functions performed by TD109 Fig. 16 at FP1 correspond exactly to those of TD68 in Fig. 10. When the hold condition has disappeared for an interval between a PQ and a PR Fig. 16 pulse, the version of the channel pulse train stored in TD108 Fig. 16 and FP1 is deleted in PSG110 Fig. 16 and no hold signal appears on the output of PCG119 Fig. 16. No hold signal therefore appears on the output of D111 Fig. 16 and provided that the called party has not answered or that the metering has been completed no output appears from PSG70 Fig. 16. If however the pulse is still stored at FP2 in TD105 Fig. 15, the pulse on the output PL121 of PCG121 Fig. 15 which is applied to PSG70 Fig. 16 and via DM106 Fig. 16 to PSG106 Fig. 16 maintains the storage of the FP2 information in TD105, TD106 Fig. 15, TD107, TD108 and TD109 Fig. 16 until the next PB pulse to PCG89 Fig. 16 when the hold at FP2 to the storage devices is deleted. This will also remove the suppression from PSG106 Fig. 16 and the hold signal from K6 to PHL5 will be interrupted in PSG105 Fig. 14 thus allowing the connection to release.

Thus the functions performed by the arrangement of Figs. 8, 9, 10 and 11 may be carried out using the arrangement of Figs. 13, 14, 15 and 16 with a considerable saving in the number of storage devices. It will be clear that there are many other alternative ways of carrying the invention into effect.

Although the invention has been described in its application to communication systems employing time division multiplex it is not limited to that application but may be used in connection with other systems. For example the invention can be applied to existing communication systems employing electro mechanical switches for establishing communciation between circuits but it will be appreciated that it will be necessary to ensure that operating leads from the system to the supervisory equipment include apparatus for translating operating signals into the form required by the supervisory unit and/or applying the output of the unit to the circuits of the system. The invention may similarly be applied to frequency division communication systems when the trunks are frequency channels.

Similarly, the invention may be applied to control apparatus other than supervisory apparatus.

I claim:

1. Apparatus for transmitting a plurality of signals to a group of trunks of a communication system in which each trunk is identified by a pulse train forming one of a series of time spaced pulse trains, comprising in combination, a transmitting system for each signal, connections from each transmitting system to the trunks, and, for each transmitting system, a pulse storage system having its output connected to the input of the transmitting system, and an input circuit for applying to the pulse storage systems the pulses of pulse trains of trunks to which signals are to be transmitted and to control the duration of storage of the pulse storage system.

2. Apparatus according to claim 1 in which at least one of the pulse storage systems comprise a single pulse train storage device while at least another of the pulse storage systems comprise a plurality of pulse storage devices.

3. Time division multiplex communication apparatus comprising in combination a communication highway providing a number of communication channels each identified by one pulse train of a series of time spaced pulse trains, control signal transmitting apparatus coupled by connections to said highway and comprising a plurality of sources of control signals, a plurality of pulse modulators, a plurality of pulse storage systems, said connections coupled to each pulse modulator from one of the sources of control signal and to each pulse modulator from one of the pulse storage systems, and a pulse input circuit for each pulse storage system for inserting into the pulse storage systems pulses of pulse trains identifying channels to which control signals from the respective source thereof are to be sent and to control the duration of storage of the pulse storage system.

4. Time division multiplex communication apparatus according to claim 3 and comprising for each of said pulse modulators a source of modulating signal tone, each tone characterizing one facility to be extended to the trunks.

5. Time division multiplex communication apparatus according to claim 3 and comprising for one of said pulse modulators, a source of modulating tone, a first and second pulse train storage devices are applied, the output of said coincidence gate circuit being connected to said one pulse modulator, and means for storing pulse trains characterizing trunks in said first storage device and in said second storage device, the storage in said second device limiting the storage in the first device to a predetermined period.

6. Time division multiplex communication apparatus according to claim 3 and comprising for another one of said pulse modulators, a source of modulating signal tone connected to said pulse modulator, a first pulse train storage device, a group of pulse train storage devices, a first coincidence gate circuit, a source of timing pulses for each of said further coincidence gate circuits, means for inserting pulse trains characterizing trunks into said first storage device and into selected storage devices of said group, and further means for deleting stored pulse trains from all said pulse train storage devices after a predetermined interval.

7. Time division multiplex communication apparatus according to claim 3 and comprising for one of said pulse modulators, a pulse hold lead, a de-coupling circuit of which the pulse hold lead forms an output lead, a first pulse train storage device and means for causing the storage of pulse trains characterizing trunks in respect of which a signal is to be transmitted over said pulse hold lead, the output of said pulse storage systems being applied to said de-coupling circuit, another storage device and means for causing the storage of said pulse trains in said other storage device when the transmission of said signal is to cease on occurrence of predetermined conditions, a pulse train coincidence circuit to which the output of said first storage device is connected, another pulse train storage device to which the output of said coincident circuit is applied, and means for causing the deletion of said first storage device of pulse trains stored in said other storage device for a predetermined time.

8. Time division multiplex communication apparatus comprising in combination a communication highway providing a number of time division multiplex communication channels each identified by one pulse train of a series of time spaced pulse trains, control signal transmitting apparatus coupled by connections to the highway, said control signal transmitting apparatus comprising a plurality of sources of control signals, a plurality of pulse modulators, a plurality of pulse storage systems, said connections coupling each of said pulse modulators to one of the sources of control signals and to one of the pulse storage systems, a pulse train transmitting circuit connected to the output of one of the pulse storage systems, and a pulse input circuit for inserting in the pulse storage systems pulses of the pulse trains identifying the channels to which signals are to be transmitted.

9. Time division multiplex communication apparatus according to claim 8 and further comprising for one of said control signal transmitting apparatus, a pulse train modulating device, a source of modulating signal tone connected to said control signal transmitting apparatus, a coincidence gate circuit connected to said modulating device, first and second pulse train storage devices whose outputs are applied to said coincidence gate circuit and means for causing the storage in said first and second pulse train storage devices of the pulse trains of trunks to which said modulating signal tone is to be transmitted.

10. Time division multiplex communication apparatus according to claim 8 and further comprising for another of said control signal transmitting apparatus a pulse train modulating device, a source of modulating signal tone connected to said device, a suppression gate circuit whose output is connected to said device, first and second pulse train storage devices whose outputs are applied to said suppression gate circuit and means for causing the storage in said second storage device of the pulse trains characterizing trunks to which said modulating signal tone is to be transmitted, said pulse trains being suppressed in said suppression gate circuit in case of said coincidence pulse train being stored in the first pulse train storage device.

11. Apparatus for transmitting control signals to a plurality of groups of trunks in a communication system in which each trunk in each group is characterized by a pulse train forming one of a series of time spaced pulse trains the series of pulse trains for all groups being synchronized, said apparatus comprising, in combination, for each group of trunks a plurality of systems for transmitting signals to the trunks, each signal being transmitted by a particular transmitting means in the group, group control circuits for applying the pulse trains of all trunks in the group to which desired signals are to be transmitted to the particular transmitting means transmitting those signals to trunks in that group and further comprising control circuits common to the plurality of groups comprising a plurality of common pulse train storage devices and means for storing pulses of the pulse trains of trunks to which signals are to be transmitted in some of said further storage devices, said storage of pulse trains being maintained by pulses coinciding with pulse trains characteristic of the groups containing the trunks.

References Cited in the file of this patent

UNITED STATES PATENTS

| | | |
|---|---|---|
| 2,490,833 | Ransom | Dec. 13, 1949 |
| 2,619,548 | Lesti | Nov. 25, 1952 |
| 2,638,505 | Van Mierlo et al. | May 12, 1953 |
| 2,716,159 | Flowers | Aug. 23, 1955 |
| 2,727,094 | Flowers et al. | Dec. 13, 1955 |
| 2,773,934 | Trousdale et al. | Dec. 11, 1956 |
| 2,917,583 | Burton et al. | Dec. 15, 1959 |